United States Patent [19]

Rosenzweig

[11] 4,228,954
[45] Oct. 21, 1980

[54] TEXTILE ARTICLE

[75] Inventor: William Rosenzweig, New York, N.Y.

[73] Assignee: Fashion Ribbon Company Inc., New York, N.Y.

[21] Appl. No.: 22,876

[22] Filed: Mar. 22, 1979

[51] Int. Cl.² ............................................. B32B 7/00
[52] U.S. Cl. ..................................... 239/60; 53/452; 239/57; 428/68; 428/71; 428/246; 428/905
[58] Field of Search ................... 428/71, 68, 905, 246; 53/452, 472; 239/57, 60

[56] References Cited

U.S. PATENT DOCUMENTS

| | | | |
|---|---|---|---|
| 2,615,754 | 10/1952 | Lindenberg | 428/905 |
| 2,979,268 | 4/1961 | Brun | 239/60 |
| 3,412,907 | 11/1968 | Faso | 428/905 |
| 3,685,734 | 8/1972 | Paciorek et al. | 428/905 |
| 3,947,971 | 4/1976 | Bauer | 239/60 |
| 4,037,353 | 7/1977 | Hennart et al. | 428/905 |
| 4,145,001 | 3/1979 | Weyenberg et al. | 428/905 |

*Primary Examiner*—James J. Bell

*Attorney, Agent, or Firm*—Kirschstein, Kirschstein, Ottinger & Cobrin

[57] ABSTRACT

A unitary composite puffy scented textile article and method of making the same. The textile article is shaped and formed to be both puffy and scented, e.g. in the shape of a heart to be used as a sachet, by steps including peripheral heating and fusing via a radio frequency generator followed by peripheral cutting, so that the article is characterized by a sealed and bonded periphery. The article includes, seriatim and in planar parallelism, a first layer of gas-permeable cloth, e.g. satin or taffeta, a plurality of planar plies of spongy, resilient filler, at least one fragrance pill, the pill being disposed between the plies, at least one sheet of a thermally activatable bonding agent, and a second layer of gas-permeable cloth, e.g. satin or taffeta. The layers, plies and sheets overlap and coincide in the finished article which is characterized by being a shaped textile article which is both puffy and scented, e.g. a sachet or small pillow, and which has an integral and permanent peripheral edge zone which is both sealed and permanently bonded.

18 Claims, 7 Drawing Figures

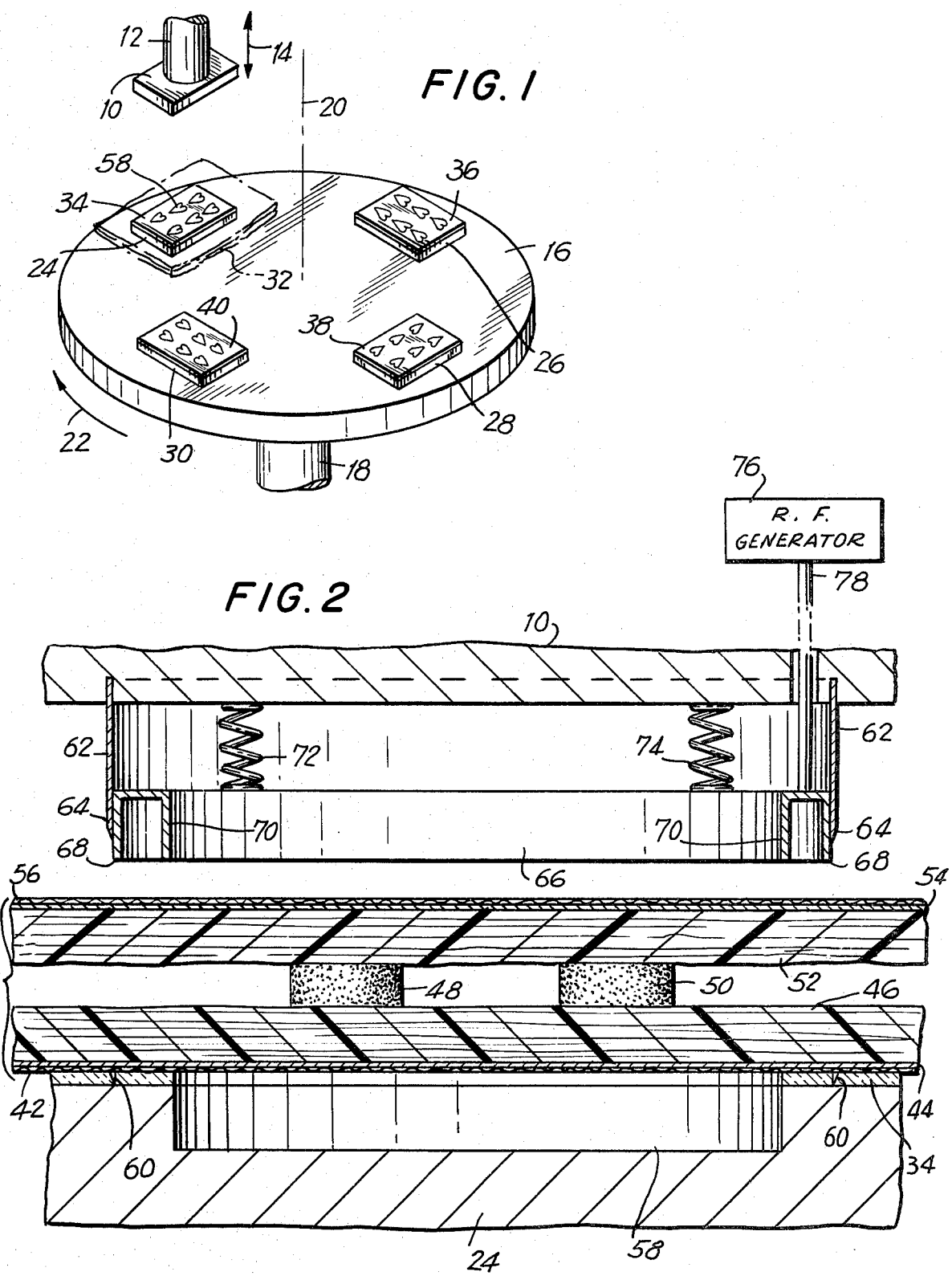

TEXTILE ARTICLE

BACKGROUND OF THE INVENTION

1. Field of the Invention

A shaped, unitary, composite, puffy and scented textile article and method of making the article.

2. Description of the Prior Art

Sachets and the like textile articles have been worn and enjoyed by women for many years. The typical sachet is a small textile article to be pinned to and worn under the clothing and characterized by having a pleasing cloth covering, typically satin, with internal padding consisting of batting or filler together with at least one fragrance pill which provides a pleasing fragrance or odor to the article. Other scented textile articles such as small pillows have also been commercially available. In the prior art configurations, peripheral closure of the article is attained by stitching of the edges of the opposed outer cloth coverings, which are typically satin, taffeta, linen, cotton, a woven synthetic such as nylon, or the like. Since the pleasing scent of the article is important for optimum pleasure and utility of the article, in all such cases the outer cloth layers consist of a gas-permeable cloth. Typical prior art relative to sachets and other scented articles of manufacture composed of textiles or the like include U.S. Pat. Nos. 649,826; 2,615,754; 2,979,268; 3,441,353; 3,544,007 and 3,575,345.

SUMMARY OF THE INVENTION

Purposes of the Invention

It is an object of the present invention to provide an improved textile article.

Another object is to provide a textile article which is puffy and scented.

A further object is to provide a shaped textile article with improved peripheral sealing of the edges of the opposed outer cloth coverings.

An additional object is to provide an improved method for making a shaped, puffy and scented textile article.

Still another object is to provide a method of making a textile article, and the shaped, puffy and scented textile article per se, which is capable of mass production at a low cost.

Still a further object is to provide a textile article, and method of making the article, of sturdy construction with high durability.

An object is to provide a shaped, puffy and scented textile article as an article of manufacture which has a pleasing appearance, feel and odor.

An object is to provide a shaped textile article which is both puffy and scented, and which is characterized by the provision of improved permanent sealing and bonding about its periphery.

An object is to provide a textile article which has improved mass consumer appeal.

These and other objects and advantages of the present invention will become evident from the description which follows.

Brief Description of the Invention

In the present invention, the new and improved textile article is made by means of a novel method for the fabrication and formation of a textile article. The method of making the present shaped, unitary, composite, puffy and scented textile article includes the provision of a sealing die plate and a negative die plate of specific configurations, to accomplish the formation of the textile article. Each of the die plates has at least one cavity. The negative die plate matches the sealing die plate and has a mating cavity smaller in overall size than that of the sealing die plate. The sealing die plate has a peripheral steel rule die about its cavity, which steel rule die is in the shape of the periphery of the textile article, e.g. heartshaped as when the textile article is a sachet or rectangular in shape as when the textile article is a small scented pillow or the like. The sealing die plate has an inner spring-loaded brass die parallel and adjacent to, and within, the steel rule die. The brass die, being spring-loaded, normally extends out from the surface of the sealing die plate beyond the edge of the steel rule die, and in one preferred embodiment, the brass die actually consists of a pair of juxtaposed parallel discrete brass dies.

The method invention also includes the provision of a flat planar sheet of insulating material, e.g. paper such as fish paper or paper containing integral glass, mica, plastic such as bakelite, or the like. When fish paper is employed, the paper is typically 0.015 gage. The sheet of insulating material is used for insulation of radio frequency (R.F.) return, as will appear infra. A pattern is cut from the sheet of insulating material. The pattern includes an opening having the same shape and size as the cavity in the negative die plate. The sheet of insulating material is then secured to the negative die plate so that the pattern cannot shift, with the opening in the sheet of insulating material being in registration with the cavity in the negative die plate.

The sealing die plate and the negative die plate are then disposed in juxtaposed registration, with the insulating sheet-covered side of the negative die plate facing the sealing die plate. Successively, and in planar parallelism, the elements of the textile article are now inserted between the registered sealing die plate and negative die plate. These elements include, in the broadest embodiment of the invention, a first layer of gas-permeable cloth, a plurality of planar plies of spongy resilient filler, at least one fragrance pill, the pill being disposed between the plies, at least one sheet of a thermally activatable bonding agent, and a second layer of gas-permeable cloth. All of the layers, plies and sheet overlap and coincide, and are larger than and extend beyond the area defined by the steel rule die.

The sealing die plate and the negative die plate are then moved from a juxtaposed position to a closer contiguous position relative to each other for a finite time interval, with the brass die now bearing down against the superposed layers, plies and bonding agent sheet. An elevated temperature is now generated during at least a finite portion of the finite time interval, by means of a radio frequency generator which is juxtaposed with the sealing die plate opposite to the negative die plate. Thus, peripheral sealing and bonding of the layers and interposed bonding agent sheet and plies takes place in a sealed and bonded peripheral zone. During the aforementioned finite portion of the finite time interval, when the elevated temperature is generated by means of the radio frequency generator, the sheet of insulating material serves to insulate and to provide radio frequency return.

A force is now exerted against the sealing die plate toward the negative die plate, the negative die plate being fixed, so that the brass die is retracted into the sealing die plate, and so that the steel rule die cuts the textile article away from peripheral material about the sealed and bonded zone. The resulting textile article is then removed from between the sealing die plate and the negative die plate.

In this manner, a unitary, shaped, composite, puffy and scented textile article is produced. The resulting textile article includes seriatim, a first layer of a gas-permeable cloth, a first planar ply of spongy resilient filler, at least one fragrance pill, a second planar ply of spongy resilient filler, at least one sheet of a thermally activatable bonding agent, and a second layer of a gas-permeable cloth. The fragrance pill is centrally disposed between the first and second plies of filler. All of the layers, plies and sheet overlap and coincide, and the layers and interposed plies and sheet are peripherally sealed and bonded by the concomitant application of elevated temperature and pressure to the sheet of bonding agent (and concomitantly to the layers and plies) adjacent the periphery of the article.

Typically the negative die plate has a cavity in the range of about 0.20 inch to about 0.30 inch smaller about its periphery than the cavity of the sealing die plate. The elevated temperature which is generated will generally be in the range of about 300° F. to about 350° F. The finite time interval will usually be in the range of about 10 seconds to about 20 seconds, and in this case the finite portion of the finite time interval, during which the elevated temperature is generated, will typically be in the range of about 5 seconds to about 15 seconds.

Generally the layers of cloth may be any suitable gas-permeable cloth, e.g. satin, taffeta, linen, muslin, woven cotton such as muslin or shantung, or even woven nylon or rayon cloth. During the formation of the textile article, a layer of lace may be provided external to each of the cloth layers, so that the finished product has an integral outer layer of lace on each side. This could particularly be done with taffeta or the like goods. The planar plies of spongy resilient filler may consist of any suitable material such as a thermoplastic polyester, foamed polyurethane, batting such as cotton batting, etc. Typically the number of plies of filler is two; however, three or more plies may be provided in practice, depending on the product. A preferred number of fragrance pills is three, with the three pills being juxtaposed in a triangular pattern between the planar plies of filler. It will be appreciated, of course, that one or two pills may be provided in practice, or even more than three pills, depending inter alia on the configuration and size of the textile article. In one preferred embodiment, the number of sheets of bonding agent is two, each of the two sheets being disposed between a respective cloth layer and a planar ply of filler. A typical thermally activatable sheet bonding agent suitable for the present invention is PELON SL-100, 22142. Other feasible compatible sheet form bonding agents will occur to those skilled in the art. Among these may be mentioned the protein-type plastics such as zein, casein, glue, casein-formaldehyde, or polyurethanes, or proprietary formulations containing a polyurethane. Among these may be mentioned APPARELOCK; W-511 and W-411. The textile article may be of any desired shape or configuration, e.g. heart shaped as when the textile article is a sachet, rectangular or pillow-shaped as when the textile article is small scented pillow, circular or rounded as when a disc-shaped textile article is desired, oval, etc.

The present textile article provides several salient advantages. The textile article is both pleasing in appearance and appealing to the sense of smell. Thus, if the textile article is a sachet or the like, it can be worn and enjoyed by women, and other configurations of textile article such as a small pillow may be disposed in households about living room furniture to provide a pleasing and scented setting for the family. The textile article is shaped, puffy and scented and thus possesses utility in general in both homes and offices; in the latter instance, an exemplary usage for the textile article would be in the office reception room or area. The shaped textile article possesses improved peripheral sealing and bonding of the edges of the opposed outer cloth coverings. Laborious and costly hand or machine stitching of the textile article has now been obviated and eliminated. The present improved method makes the article capable of being mass produced at a low cost. The textile article is of sturdy construction with high durability. The textile article has a pleasing appearance, puffy feel and a pleasant odor or scent. In this regard, typical fragrance pills provide the scent of flowers such as lilly of the valley, lilac, roses, etc. Other feasible scents or fragrances include jasmine, pine, almond, orange and ambrosia. Thus the present shaped textile article is both puffy and scented, and is characterized by the provision of improved and permanent peripheral sealing and bonding. Thus a commercial advantage of the present textile article is that it has improved mass consumer appeal.

The invention accordingly consists in the features of construction, combination of elements, arrangement of parts and series of steps which will be exemplified in the method and article of manufacture hereinafter described and of which the scope of application will be indicated in the appended claims.

BRIEF DESCRIPTION OF THE DRAWINGS

In the accompanying drawings in which are shown several of the various possible embodiments of the invention:

FIG. 1 is an overall perspective view of the present textile articles (sachets) being produced in a commercial facility;

FIG. 2 is a sectional elevation view of the opposed sealing die plate and negative die plate as oriented relative to the elements of a single textile article:

DETAILED DESCRIPTION OF THE PREFERRED EMBODIMENTS

Figure 3:
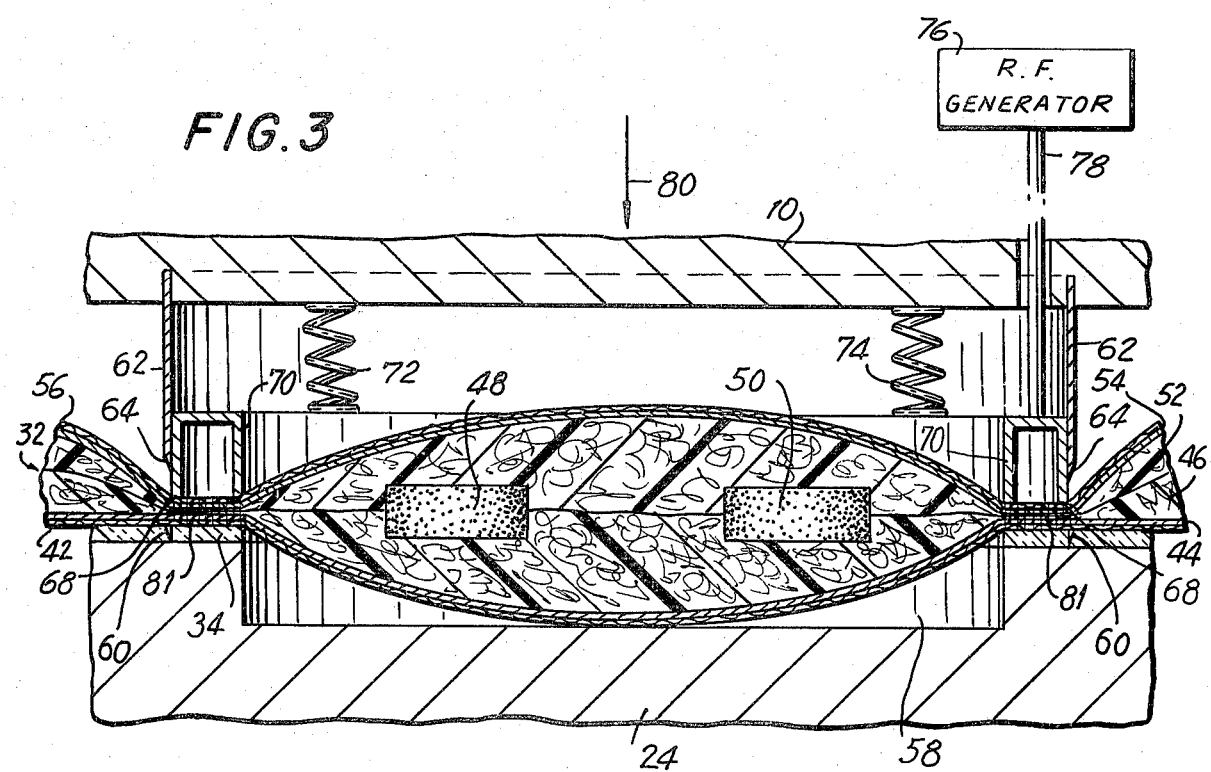
FIG. 3 shows the stage of production succeeding that of FIG. 2, namely with the spring-loaded brass dies compressing the layers of material, i.e. at the periphery of the to-be-formed textile article; radio frequency heating is being applied.

Referring now to FIG. 1, a sealing die plate 10 is suspended from a vertically displaceable support means 12, so that the plate 10 is movable vertically up and down as indicated by the double-headed vertical arrow 14. The plate 10 is suspended above a circular or disc-shaped horizontal work table 16, which is supported from below by a horizontally rotatable support means 18. The means 18 is periodically and intermittently rotated about its central vertical axis so that the table 15 also intermittently rotates about its central vertical axis 20, in the clockwise direction indicated by the arrow 22. Thus, the four flat planar negative die plates 24, 26, 28 and 30, which are disposed on the upper surface of the table 16 at spaced locations, are alternately and successively brought under and into registration with the sealing die plate 10. As shown, the negative die plate 24 is in this disposition, with the layers, plies and sheets described supra, which make up the textile article, in this case a sachet, having been disposed in overlapping and coinciding relationship on top of the negative die plate 24, as shown in phantom outline 32. As is evident, six sachets are to be concomitantly formed and made, while the plates 10 and 24 are in registration. Subsequently, another six sachets will be made when the table 16 is rotated to bring the plate 30 into registration with the sealing die plate 10. A sheet 34 of insulating material is secured to the negative die plate 24 below the layers, plies and sheets 32. Similar sheets 36, 38 and 40 of insulating material are secured to the upper surface of the respective negative die plates 26, 28 and 30.

The FIG. 1 orientation of the elements is shown in detail in FIG. 2. Here may be seen the elements involved in the production of a single sachet. With specific regard to the elements 32, these consist of a first layer 42 of gas-permeable satin cloth, a first sheet 44 of thermally activatable bonding agent, a first ply 46 of spongy resilient filler, the fragrance pills 48 and 50, a second ply 52 of spongy resilient filler, a second sheet 54 of thermally activatable bonding agent, and a second layer 56 of gas-permeable satin cloth. It will be appreciated that the satin layer 42 will be disposed face down, and the satin layer 56 will be disposed face up, so that the finished sachet will present on its outer surface the shiny and smooth face of the satin cloth.

FIG. 2 also shows a portion of the negative die plate 24, with the sheet 34 of insulating material being secured to its upper surface and extending about the periphery of the individual cavity 58 of the negative die plate 24, the cavity 58 being one of the six cavities shown (FIG. 1) in the plate 24. The sheet 34 of insulating material has a recess or groove 60 in its surface adjacent the periphery of the cavity 58, to accommodate the cutting edge of the steel rule die, as will appear infra.

FIG. 2 further shows a portion of the sealing die plate 10. As shown, a steel rule die 62 having a lower terminal cutting edge 64 is mounted to the plate 10 about the periphery of the cavity 66 in the sealing die plate 10. An inner brass die, consisting in this case of the discrete parallel individual brass dies 68 and 70, is mounted to plate 10 parallel and adjacent to and within the steel rule die 62. The unitary brass die 68-70 is spring-loaded via springs 72,74 which extend from the brass die 68-70 to the body of the sealing die plate 10. A radio frequency (R.F.) generator 76, shown in schematic outline, is disposed above the sealing die plate 10 via mounting 78, so that radio frequency heating may be applied when the sealing die plate moves downwards, as will appear infra.

Figure 4:
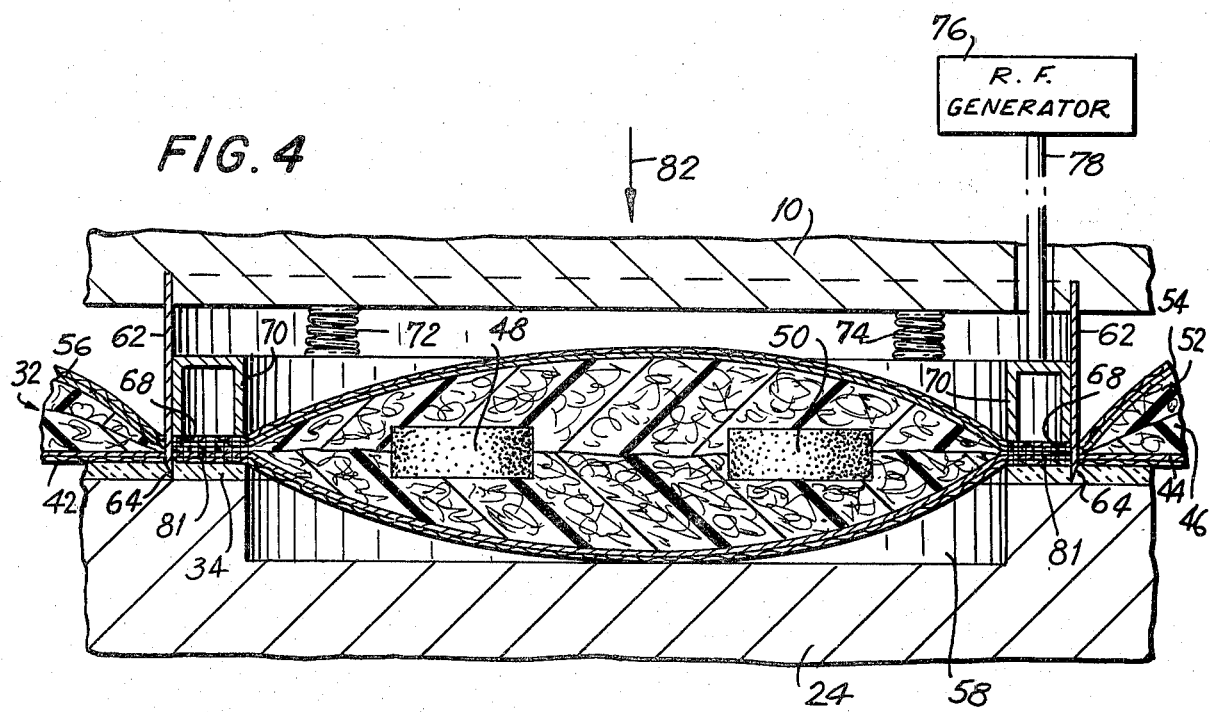
FIG. 4 shows the subsequent stage in which the steel rule die cuts at the sealed and bonded periphery of the textile article.

FIGS. 3 and 4 shown the successive stages of formation of the sachet. As the sealing die plate 10 is moved downward as indicated by the arrow 80 in FIG. 3, the peripheral edges of the layers, plies and sheets are compressed by the brass dies 68, 70, and concomitantly the R.F. generator 76 is turned on for a finite time interval, so as to heat, fuse and bond these peripheral edges into a permanent and durable peripheral zone 81. As the sealing die plate 10 is moved further downward as indicated by the arrow 82 in FIG. 4, a compressive force, typically 2000 psi, is exerted by the sealing die plate 10 against the negative die plate 24. The springs 72 and 74 become compressed, as shown in FIG. 4, and the cutting edge 64 of the steel rule die 62 has penetrated through the layers, plies and sheets so as to cut at the fused peripheral zone and thus cut out the sachet shape away from peripheral extraneous material. The cutting edge 84 of the steel rule die 62 now extends into the groove or recess 60.

Figure 5:
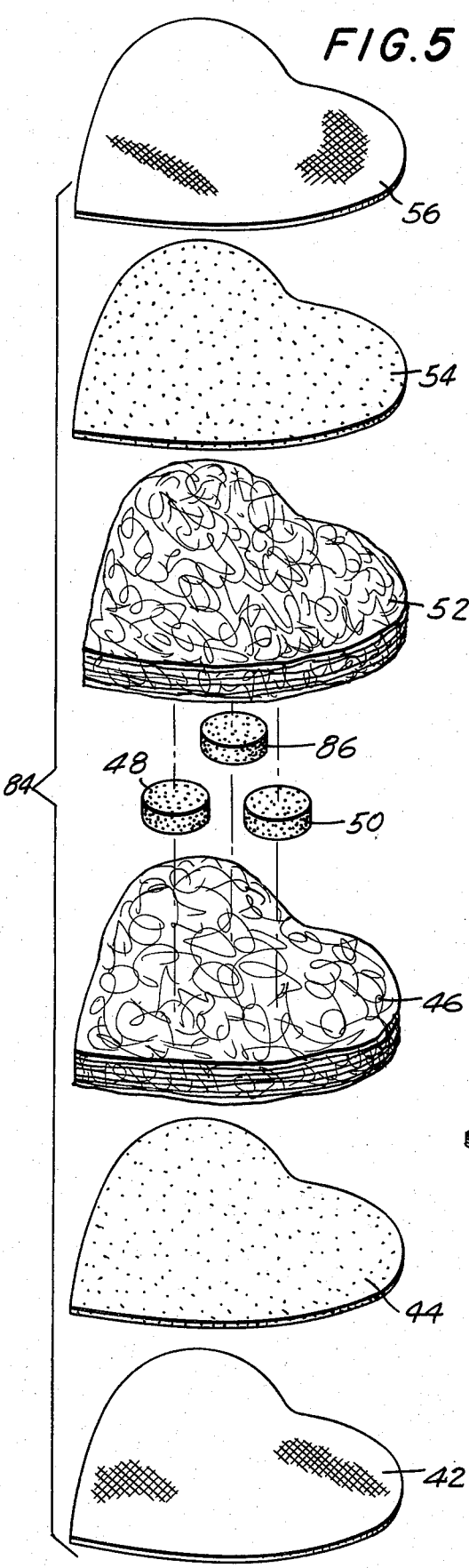
FIG. 5 is an exploded view of a typical textile article of the present invention, in this case a sachet.
Figure 6:
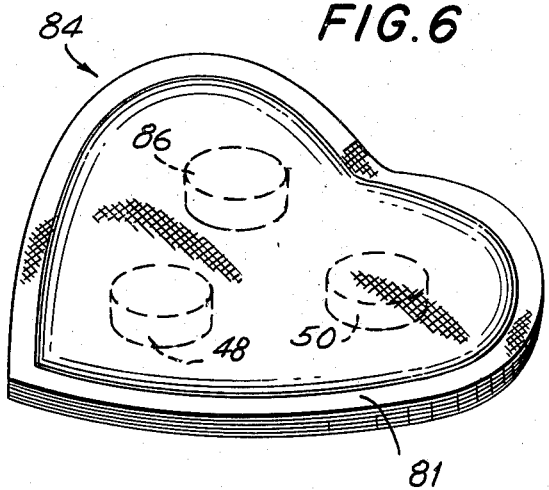
FIG. 6 illustrates the final form of the sachet of FIG. 5 as marketed.

FIGS. 5 and 6 show the finished sachet 84. Like numbers as in the prior figures have been used to designate the respective elements of the finished sachet (FIG. 5). A third fragrance pill 86 is also shown, with the three pills 48, 50 and 86 being oriented in a triangular pattern inside the finished sachet, as shown in phantom outline (FIG. 6). FIG. 6 also shows the peripheral fused, sealed and bonded zone 81 of the sachet 84. It is to be noted that the sachet 84 as shown in FIG. 6 is a shaped unitary composite puffy scented textile article having the sealed and bonded peripheral zone 81, formed in accordance with the method of the present invention.

Figure 7:
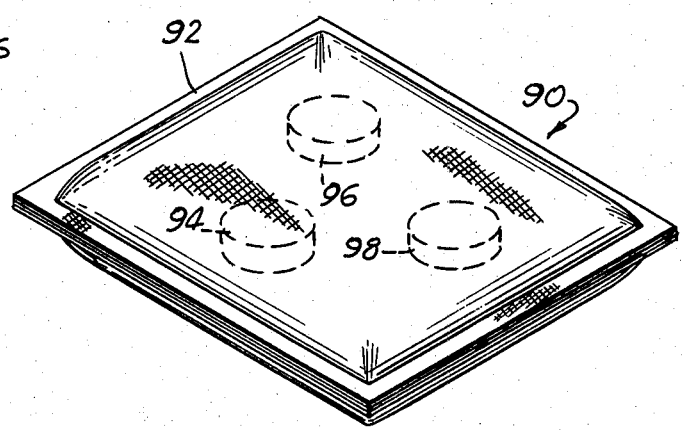
FIG. 7 illustrates an alternative textile article, in this case a small rectangular pillow.

FIG. 7 shows an alternative configuration of the present textile article, namely a small rectangular pillow 90 having a peripheral sealed and bonded zone 92, with inner fragrance pills 94, 96 and 98 being shown in phantom outline.

It thus will be seen that there is provided an article of manufacture, and a method for making the article, which achieve the various objects of the invention and which are well adapted to meet the conditions of practical use.

As various possible embodiments might be made of the above invention, and as various changes might be made in the embodiments above set forth, it is to be understood that all matter herein described or shown in the accompanying drawings is to be interpreted as illustrative and not in a limited sense. Thus, it will be understood by those skilled in the art that although preferred and alternative embodiments have been shown and described in accordance with the Patent Statutes, the invention is not limited thereto or thereby.

Having thus described the invention, there is claimed as new and desired to be secured by Letters Patent:

1. A method of making a shaped unitary composite puffy scented textile article which comprises providing a sealing die plate and a negative die plate, each of said die plates having at least one cavity, said negative die plate matching said sealing die plate and having a matting cavity smaller in overall size than that of said sealing die plate, said sealing die plate having a peripheral steel rule die about its cavity, said steel rule die being in the shape of the periphery of the textile article, said sealing die plate having an inner spring-loaded brass die parallel and adjacent to and within said steel rule die, said brass die normally extending out beyond the edge of said steel rule die, providing a flat planar sheet of insulating material, cutting a pattern from said sheet of insulating material, said pattern including an opening having the same shape and size as the cavity in said negative die plate, securing said sheet of insulating material to said negative die plate so that said pattern cannot shift, with the opening in said sheet of insulating material being in registration with the cavity in said negative die plate, disposing said sealing die plate and said negative die plate in juxtaposed registration, with the insulating sheet-covered side of said negative die plate facing said sealing die plate, inserting between the registered sealing die plate and negative die plate, successively and in planar parallelism, a first layer of gas-permeable cloth, a plurality of planar plies of spongy resilient filler, at least one fragrance pill, said pill being disposed between said plies, at least one sheet of a thermally activatable bonding agent, and a second layer of gas-permeable cloth, all of said layers, plies and sheet overlapping and coinciding and being larger than and extending beyond the area defined by said steel rule die, moving said sealing die plate and said negative die plate from a juxtaposed position to a contiguous position relative to each other for a finite time interval, generating an elevated temperature during at least a finite portion of said finite time interval by means of a radio frequency generator juxtaposed with said sealing die plate and opposite to said negative die plate, so that peripheral sealing and bonding of said layers and interposed bonding agent sheet and plies takes place in a sealed and bonded peripheral zone, said insulating material sheet serving to insulate and to prove radio frequency return during said finite portion of said finite time interval, exerting a force against said sealing die plate toward said negative die plate, said negative die plate being fixed, so that said brass die is retracted into said sealing die plate and said steel rule die cuts the textile article away from peripheral material about said sealed and bonded zone, and removing the resulting textile article from between said sealing die plate and said negative die plate.

2. The method of making a textile article of claim 1 in which the negative die plate has a cavity in the range of about 0.20 inch to about 0.30 inch smaller about its periphery than the cavity of the sealing die plate.

3. The method of making a textile article of claim 1 in which said layers of gas-permeable cloth comprise satin.

4. The method of making a textile article of claim 1 in which said planar plies of spongy resilient filler comprise a thermoplastic polyester.

5. The method of making a textile article of claim 1 in which the number of plies of filler is two.

6. The method of making a textile article of claim 1 in which the number of fragrance pills is three, the three pills being juxtaposed in a triangular pattern between the planar plies of filler.

7. The method of making a textile article of claim 1 in which the elevated temperature generated is in the range of about 300° F. to about 350° F.

8. The method of making a textile article of claim 1 in which the finite time interval is in the range of about 10 seconds to about 20 seconds.

9. The method of making a textile article of claim 8 in which the finite portion of the finite time interval, during which time the elevated temperature is generated, is in the range of about 5 seconds to about 15 seconds.

10. The method of making a textile article of claim 1 in which the number of sheets of bonding agent is two, each of the two sheets being disposed between a respective cloth layer and a planar ply of filler.

11. The method of making a textile article of claim 1 in which the brass die comprises a pair of juxtaposed parallel discrete brass dies.

12. A unitary shaped composite puffy scented textile article comprising, seriatim, a first layer of a gas-permeable cloth, a first planar ply of spongy resilient filler, at least one fragrance pill, a second planar ply of spongy resilient filler, at least one sheet of a thermally activatable bonding agent, and a second layer of a gas-permeable cloth, said fragrance pill being centrally disposed between said first and second plies of filler, all of said layers, plies and sheet overlapping and coinciding, said layers and interposed plies and sheet being peripherally sealed and bonded by the application of elevated temperature and pressure to the sheet of bonding agent adjacent the periphery of the article.

13. The article of claim 12 in which the textile article is heart-shaped.

14. The article of claim 12 in which the textile article is pillow-shaped.

15. The article of claim 12 in which the layers of gas-permeable cloth comprise satin.

16. The article of claim 12 in which the planar plies of filler comprise a thermoplastic polyester.

17. The article of claim 12 in which the number of fragrance pills is three, the three pills being juxtaposed in a triangular pattern between the first and second plies of filler.

18. The article of claim 12 in which the number of sheets of bonding agent is two, each of the two sheets being disposed between a respective cloth layer and a planar ply of filler.

* * * * *